US012669813B2

(12) United States Patent
Ahmad et al.

(10) Patent No.: US 12,669,813 B2
(45) Date of Patent: Jun. 30, 2026

(54) SYSTEM AND METHOD FOR REAL-TIME ROOT CAUSE ANALYSIS AND CORRECTION IN POWER GENERATION PROCESSES

(71) Applicant: Tata Consultancy Services Limited, Mumbai (IN)

(72) Inventors: Dilshad Ahmad, Pune (IN); Purushottham Gautham Basavarsu, Pune (IN); Hrishikesh Nilkanth Kulkarni, Pune (IN); Chetan Premkumar Malhotra, Pune (IN); Thanga Jawahar Kalidoss, Chennai (IN); Swamy Doss Kolappan, Chennai (IN)

(73) Assignee: TATA CONSULTANCY SERVICES LIMITED, Mumbai (IN)

( * ) Notice: Subject to any disclaimer, the term of this patent is extended or adjusted under 35 U.S.C. 154(b) by 314 days.

(21) Appl. No.: 17/754,923

(22) PCT Filed: Oct. 19, 2020

(86) PCT No.: PCT/IB2020/059810
§ 371 (c)(1),
(2) Date: Apr. 15, 2022

(87) PCT Pub. No.: WO2021/074905
PCT Pub. Date: Apr. 22, 2021

(65) Prior Publication Data
US 2024/0142962 A1 May 2, 2024

(30) Foreign Application Priority Data
Oct. 18, 2019 (IN) .............................. 201921042436

(51) Int. Cl.
*G05B 23/02* (2006.01)

(52) U.S. Cl.
CPC ................................ *G05B 23/0275* (2013.01)

(58) Field of Classification Search
USPC .......................................................... 700/79
See application file for complete search history.

(56) References Cited

U.S. PATENT DOCUMENTS 2,097,268 A * 10/1937 Best ...................... F22B 21/081
122/347
3,163,154 A * 12/1964 Thayer ...................... F23J 3/00
15/318

(Continued)

OTHER PUBLICATIONS

Lei et al. 'An ontological metamodeling framework for semantic simulation model engineering' Journal of Systems Engineering and Electronics vol. 31, No. 3, Jun. 2020, pp. 527-538, published 2020.*

(Continued)

*Primary Examiner* — Bernard G Lindsay
(74) *Attorney, Agent, or Firm* — FINNEGAN, HENDERSON, FARABOW, GARRETT & DUNNER LLP

(57) ABSTRACT

This disclosure relates generally to systems and methods to systematically curate knowledge of industrial process(es) from various sources and generate process ontology via meta model(s). Root cause graph (RCG) is created wherein the RCG corresponds to process and root cause and failure modes in the process. The RCG is then transformed to machine instructions which are executed for root cause analysis in real time. The created graphs/knowledge also help in identifying conflicting knowledge or redundant knowledge. Present disclosure enables root cause analysis as soon as a failure occurs or as the systems show or indicate a tendency towards failure.

10 Claims, 11 Drawing Sheets obtaining, via one or more hardware processors, information pertaining to one or more industrial processes being executed by one or more equipment, wherein the information comprises one or more of piping and instrumentation diagram (PID), operational data, maintenance history, root cause knowledge, or a corresponding process model ⟶1102 generating, via one or more meta models executed by the one or more hardware processors, a process ontology using the obtained information ⟶1104 transforming the root cause knowledge to a set of machine instructions, the set of machine instructions comprising an associated detection state, wherein a logic in the set of machine instruction is derived from the root cause knowledge, wherein one or more detections are identified through a detection model using data captured in real time by the one or more sensors, and wherein information from the one or more sensors is mapped to the process ontology ⟶1106 generating, via the one or more hardware processor, a root cause path comprising one or more root causes and associated interdependencies using (i) the process ontology and (ii) the root cause knowledge, wherein the one or more root causes are detected using the detection model, and wherein the root cause path further comprises one or more actions to be executed ⟶1108

(56) References Cited

U.S. PATENT DOCUMENTS

| | | | |
|---|---|---|---|
| 8,156,378 B1 | 4/2012 | Suit | |
| 8,656,219 B2 | 2/2014 | Suit | |
| 9,859,229 B2 | 1/2018 | Tsai et al. | |
| 2006/0117295 A1* | 6/2006 | Wu | G05B 19/00 |
| | | | 717/104 |
| 2006/0191896 A1* | 8/2006 | Cheng | G05B 13/021 |
| | | | 219/497 |
| 2011/0132282 A1* | 6/2011 | Abeyta | F22B 37/545 |
| | | | 165/95 |
| 2012/0143795 A1 | 6/2012 | Han et al. | |
| 2012/0221898 A1 | 8/2012 | Suit | |
| 2012/0247405 A1* | 10/2012 | Abeyta | F23J 3/02 |
| | | | 122/390 |
| 2015/0074035 A1 | 3/2015 | Narasappa | |
| 2015/0086930 A1* | 3/2015 | Abeyta | F23J 7/00 |
| | | | 431/278 |
| 2015/0186779 A1 | 7/2015 | Deng et al. | |
| 2018/0292797 A1* | 10/2018 | Lamparter | G06F 16/144 |
| 2019/0147352 A1 | 5/2019 | Ovsak | |
| 2019/0196460 A1* | 6/2019 | Rosca | G05B 23/0254 |
| 2019/0318288 A1* | 10/2019 | Noskov | G06N 7/01 |
| 2020/0201285 A1* | 6/2020 | Hirooka | G06V 30/422 |
| 2022/0158890 A1* | 5/2022 | Karapantelakis | H04L 43/50 |

OTHER PUBLICATIONS

The English translation of Yamanaka Japanese Patent Document No. 3809981, published 2006.*

Younesi, Erfan et al., "PDON: Parkinson's disease ontology for representation and modeling of the Parkinson's disease knowledge domain", Theoretical Biology and Medical Modelling, Sep. 2015, NCBI, https://www.researchgate.net/publication/282129716_PDON_Parkinson's_disease_ontology_for_representation_and_modeling_of_the_Parkinson's_disease_knowledge_domain/link/5fc4cb52458515b7978a25e5/download.

Schoenfisch, Joerg et al., "Root Cause Analysis in IT Infrastructures using Ontologies and Abduction in Markov Logic Networks", Information Systems, May 2018, vol. 74, Part 2, pp. 103-116, Elsevier, http://publications.wim.uni-mannheim.de/informatik/Iski/Schoenfisch2017RootCauseAnalysis.pdf.

Wang, Hanzhang et al., "GRANO: Interactive Graph-based Root Cause Analysis for Cloud-Native Distributed Data Platform", IEEE Access, Aug. 2019, vol. 12, Issue: 2, pp. 1942-1945, Publisher: ACM, http://www.vldb.org/pvldb/vol12/p1942-wang.pdf.

International Search Report and Written Opinion mailed Mar. 25, 2021, in International Application No. PCT/IB2020/059810; 8 pages.

* cited by examiner

Piping and instrumentation diagram

Operational Information

Maintenance History

Root Cause Knowledge

Process Model

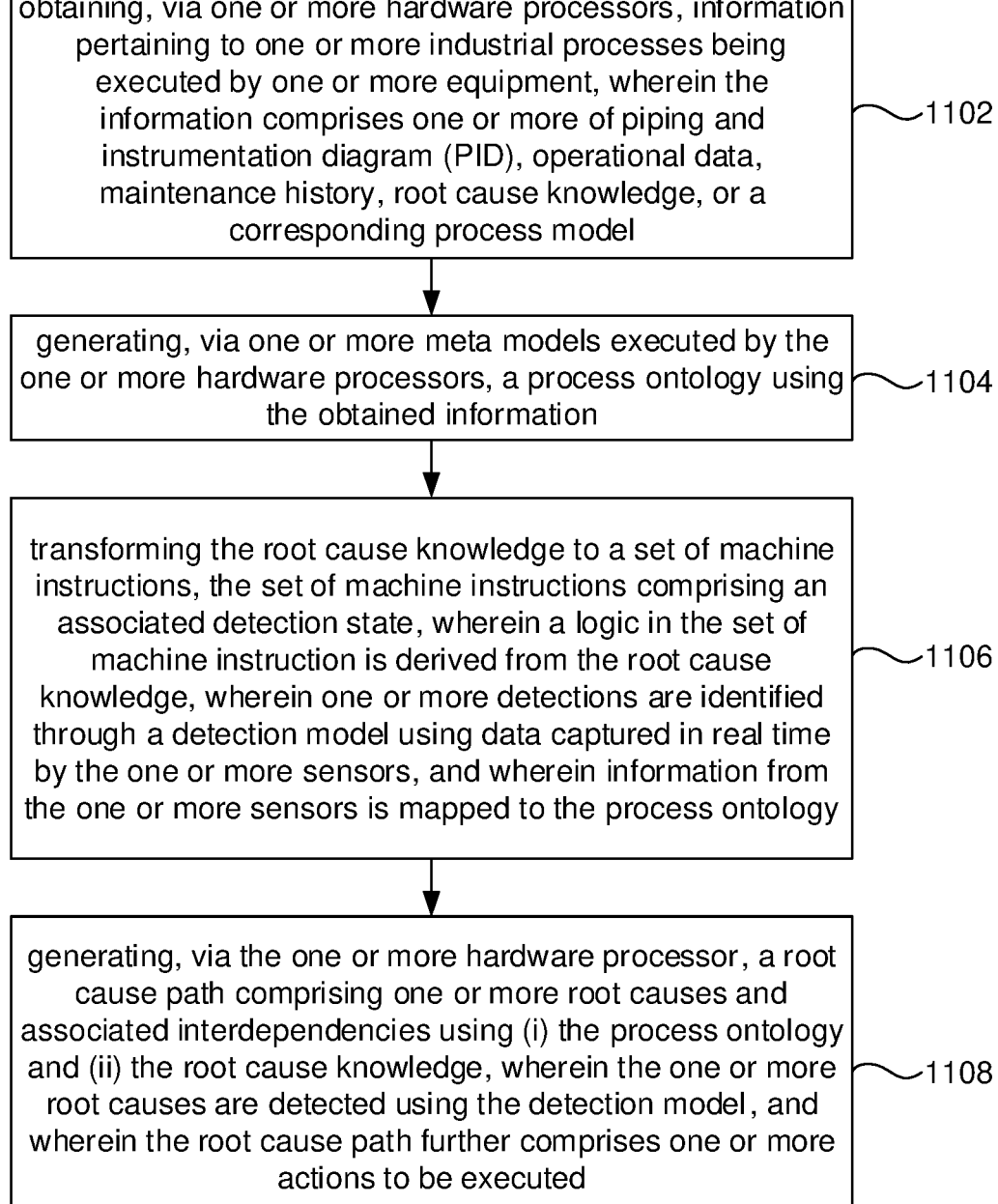

obtaining, via one or more hardware processors, information pertaining to one or more industrial processes being executed by one or more equipment, wherein the information comprises one or more of piping and instrumentation diagram (PID), operational data, maintenance history, root cause knowledge, or a corresponding process model ⌇~1102 generating, via one or more meta models executed by the one or more hardware processors, a process ontology using the obtained information ⌇~1104 transforming the root cause knowledge to a set of machine instructions, the set of machine instructions comprising an associated detection state, wherein a logic in the set of machine instruction is derived from the root cause knowledge, wherein one or more detections are identified through a detection model using data captured in real time by the one or more sensors, and wherein information from the one or more sensors is mapped to the process ontology ⌇~1106 generating, via the one or more hardware processor, a root cause path comprising one or more root causes and associated interdependencies using (i) the process ontology and (ii) the root cause knowledge, wherein the one or more root causes are detected using the detection model, and wherein the root cause path further comprises one or more actions to be executed ⌇~1108

FIG. 11

SYSTEM AND METHOD FOR REAL-TIME ROOT CAUSE ANALYSIS AND CORRECTION IN POWER GENERATION PROCESSES

CROSS-REFERENCE TO RELATED APPLICATIONS AND PRIORITY

This present application is a U.S. National Stage Filing under 35 U.S.C. § 371 and claims priority from International Application No. PCT/IB2020/059810 filed on Oct. 19, 2020, which application claims priority under 35 U.S.C. § 119 from India Application No. 201921042436, filed on Oct. 18, 2019. The entire contents of the aforementioned applications are incorporated herein by reference.

TECHNICAL FIELD

The disclosure herein generally relates to root cause analysis of failures in industrial processes, and, more particularly, to systems and methods for curation, representation and execution of root cause knowledge as root cause path.

BACKGROUND

With the advancement of technology, process industries such as power industries, manufacturing industries, and the like are growing at a rapid rate. However, occurrence of a failure in systems (or subsystems) associated with these industries may lead to huge loss in terms of time, infrastructure, cost and quality and make the systems ineffective. Further, effect of the failure at one point of a system may be propagated further affecting overall performance of the system. Thus, failures in the system must be identified beforehand. Root cause analysis refers to a mechanism for identifying exact cause of failure in the systems which is termed as root cause of the failure.

Conventionally, the process of root cause analysis in the process industry is performed manually, wherein human operators try to reason out possible root cause of failure(s) that has happened during an operation based on their experience. Further, in conventional systems, a cross functional team of human experts in a given industrial process along with a team consisting of experts on failure mode and effect analysis (FMEA), create the FMEA knowledge base in the form of documents. Such documents are called failure mode and effect analysis documents. These documents comprise details of different failure modes, associated detections and root causes at various levels, a risk priority identifier, suggestive corrective actions to be taken and department responsible for a given failure. In the event of failure, a human operator is expected to refer to these documents and find out possible root causes and respective corrective actions. However, practically, in the event of failure, looking at a document and searching for possible root causes is time consuming and subjective as users' utilization of large amount of information in the FMEA document may not be consistent. This results into inaccurate diagnosis and delays leading to loss of productivity, damage to process plant and low-quality product.

SUMMARY

Embodiments of the present disclosure present technological improvements as solutions to one or more of the above-mentioned technical problems recognized by the inventors in conventional systems. For example, in one aspect, a processor implemented method for real-time root cause analysis is provided. The method comprises: obtaining, via one or more hardware processors, information pertaining to one or more industrial processes being executed by one or more equipment, wherein the information comprises one or more of piping and instrumentation diagram (PID), operational data, maintenance history, root cause knowledge, or a corresponding process model; generating, via one or more meta models executed by the one or more hardware processors, a process ontology using the obtained information; transforming the root cause knowledge to a set of machine instructions, the set of machine instructions comprising an associated detection state, wherein a logic in the set of machine instruction is derived from the root cause knowledge, wherein the one or more detections are identified through a detection model using data captured in real time by the one or more sensors, and wherein information from the one or more sensors is mapped to the process ontology; and generating, via the one or more hardware processor, a root cause path comprising one or more root causes and associated interdependencies using (i) the process ontology and (ii) the root cause knowledge, wherein the one or more root causes are detected using the detection model, and wherein the root cause path further comprises one or more actions to be executed.

In an embodiment, the root cause knowledge is based on one or more of the PID, the operational data, the maintenance history, domain knowledge, and the corresponding process model.

In an embodiment, the corresponding process model is at least one of a data-based model, a physics-based model, an empirical model, and a hybrid model.

In an embodiment, the detection model is at least one of a data-based model, a physics-based model, a pattern identification model, an empirical model, and a hybrid model.

In an embodiment, the method further comprises generating, via the one or more hardware processor, a root cause graph using the process ontology and the root cause knowledge, wherein the root cause graph comprises one or more corresponding root causes detected using the detection model.

In an embodiment, at least one of a conflicting knowledge or a redundant knowledge is identified from the root cause graph.

In an embodiment, a first root cause comprised in the root cause graph is indicative of a performance indicator (PI) corresponding to the one or more industrial processes.

In an embodiment, one or more root causes are hierarchical arranged after one or more PIs in the root cause graph. In an embodiment, the root cause graph is represented in at least one of a tree representation format, a tabular representation format, a graphical representation format, and an unstructured representation format.

In an embodiment, the one or more corresponding root causes are detected based on a unique combination of one or more detections and the associated detection state thereof, using the detection model. In an embodiment, the associated detection state is at least one of a positive detection state and a negative detection state.

In an embodiment, the generated process ontology comprises information pertaining to one or more of (i) the one or more equipment, (ii) a corresponding location of one or more sensors deployed within the one or more equipment, (iii) sensory information captured through the one or more sensors thereof, (iv) details specific to an interaction between at least one of (a) the one or more equipment and (b) the one or more industrial processes, (v) one or more parameters of the one or more industrial processes, or (vi) one or more action plans, one or more detection states, and wherein the one or more action plans comprise one or more of repair, mitigation, containment, or control of at least one of the one or more industrial processes and the one or more equipment.

A system for real-time root cause analysis is provided. The system comprises a memory storing instructions; one or more communication interfaces; and one or more hardware processors coupled to the memory via the one or more communication interfaces, wherein the one or more hardware processors are configured by the instructions to: obtain information pertaining to one or more industrial processes being executed by one or more equipment, wherein the information comprises one or more of piping and instrumentation diagram (PID), operational data, maintenance history, root cause knowledge, or a corresponding process model; generate, via one or more meta models, a process ontology using the obtained information; transform the root cause knowledge to a set of machine instructions, the set of machine instructions comprising an associated detection state, wherein a logic in the set of machine instruction is derived from the root cause knowledge, wherein the one or more detections are identified through a detection model using data captured in real time by the one or more sensors, and wherein information from the one or more sensors is mapped to the process ontology; and generate a root cause path comprising one or more root causes and associated interdependencies using (i) the process ontology and (ii) the root cause knowledge, wherein the one or more root causes are detected using the detection model, and wherein the root cause path further comprises one or more actions to be executed.

In an embodiment, the root cause knowledge is based on one or more of the PID, the operational data, the maintenance history, domain knowledge, and the corresponding process model.

In an embodiment, the corresponding process model is at least one of a data-based model, a physics-based model, an empirical model, and a hybrid model.

In an embodiment, at least one of a conflicting knowledge or a redundant knowledge is identified from the root cause graph.

In an embodiment, the detection model is at least one of a data-based model, a physics-based model, a pattern identification model, an empirical model, and a hybrid model.

In an embodiment, the one or more hardware processors are further configured to generate a root cause graph using the process ontology and the root cause knowledge. In an embodiment, the root cause graph comprises one or more corresponding root causes detected using the detection model.

In an embodiment, a first root cause comprised in the root cause graph is indicative of a performance indicator (PI) corresponding to the one or more industrial processes.

In an embodiment, one or more root causes are hierarchical arranged after one or more PIs in the root cause graph. In an embodiment, the root cause graph is represented in at least one of a tree representation format, a tabular representation format, a graphical representation format, and an unstructured representation format.

In an embodiment, the one or more corresponding root causes are detected based on a unique combination of one or more detections and the associated detection state thereof, using the detection model. In an embodiment, the associated detection state is at least one of a positive detection state and a negative detection state.

In an embodiment, the generated process ontology comprises information pertaining to one or more of (i) the one or more equipment, (ii) a corresponding location of one or more sensors deployed within the one or more equipment, (iii) sensory information captured through the one or more sensors thereof, (iv) details specific to an interaction between at least one of (a) the one or more equipment and (b) the one or more industrial processes, (v) one or more parameters of the one or more industrial processes, or (vi) one or more action plans, one or more detection states, and wherein the one or more action plans comprise one or more of repair, mitigation, containment, or control of at least one of the one or more industrial processes and the one or more equipment.

In yet another aspect, there is provided a computer program product comprising a non-transitory computer readable medium having a computer readable program embodied therein, wherein the computer readable program, when executed on a computing device causes the computing device to perform real-time root cause analysis by: obtaining, via one or more hardware processors, information pertaining to one or more industrial processes being executed by one or more equipment, wherein the information comprises one or more of piping and instrumentation diagram (PID), operational data, maintenance history, root cause knowledge, or a corresponding process model; generating, via one or more meta models executed by the one or more hardware processors, a process ontology using the obtained information; transforming the root cause knowledge to a set of machine instructions, the set of machine instructions comprising an associated detection state, wherein a logic in the set of machine instruction is derived from the root cause knowledge, wherein the one or more detections are identified through a detection model using data captured in real time by the one or more sensors, and wherein information from the one or more sensors is mapped to the process ontology; and generating, via the one or more hardware processor, a root cause path comprising one or more root causes and associated interdependencies using (i) the process ontology and (ii) the root cause knowledge, wherein the one or more root causes are detected using the detection model, and wherein the root cause path further comprises one or more actions to be executed.

In an embodiment, the root cause knowledge is based on one or more of the PID, the operational data, the maintenance history, domain knowledge, and the corresponding process model.

In an embodiment, the corresponding process model is at least one of a data-based model, a physics-based model, an empirical model, and a hybrid model.

In an embodiment, at least one of a conflicting knowledge or a redundant knowledge is identified from the root cause graph.

In an embodiment, the detection model is at least one of a data-based model, a physics-based model, a pattern identification model, an empirical model, and a hybrid model.

In an embodiment, the method further comprises generating, via the one or more hardware processor, a root cause graph using the process ontology and the root cause knowledge, wherein the root cause graph comprises one or more corresponding root causes detected using the detection model.

5

In an embodiment, a first root cause comprised in the root cause graph is indicative of a performance indicator (PI) corresponding to the one or more industrial processes.

In an embodiment, one or more root causes are hierarchical arranged after one or more PIs in the root cause graph. In an embodiment, the root cause graph is represented in at least one of a tree representation format, a tabular representation format, a graphical representation format, and an unstructured representation format.

In an embodiment, the one or more corresponding root causes are detected based on a unique combination of one or more detections and the associated detection state thereof, using the detection model. In an embodiment, the associated detection state is at least one of a positive detection state and a negative detection state.

In an embodiment, the generated process ontology comprises information pertaining to one or more of (i) the one or more equipment, (ii) a corresponding location of one or more sensors deployed within the one or more equipment, (iii) sensory information captured through the one or more sensors thereof, (iv) details specific to an interaction between at least one of (a) the one or more equipment and (b) the one or more industrial processes, (v) one or more parameters of the one or more industrial processes, or (vi) one or more action plans, one or more detection states, and wherein the one or more action plans comprise one or more of repair, mitigation, containment, or control of at least one of the one or more industrial processes and the one or more equipment.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this disclosure, illustrate exemplary embodiments and, together with the description, serve to explain the disclosed principles.

6

Figure 9:
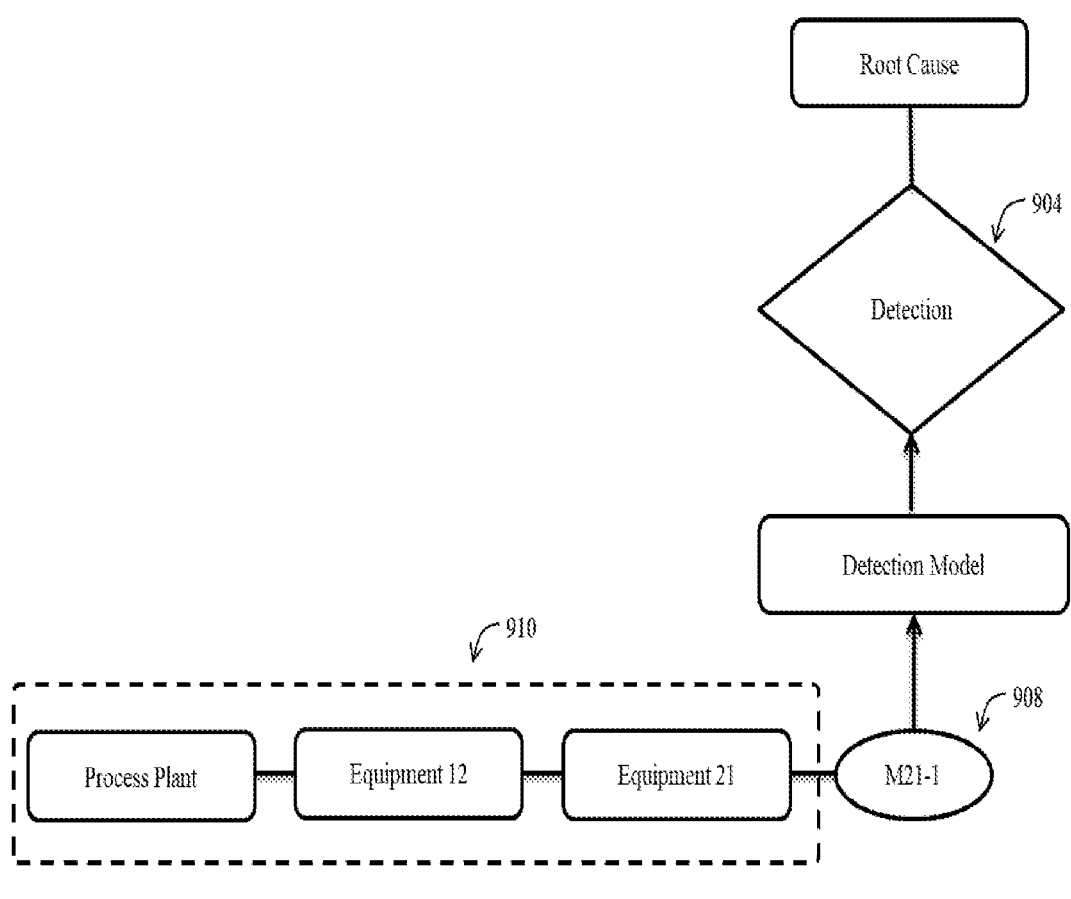

FIG. 9 illustrates a flow diagram depicting steps of binary detection, in accordance with some embodiments of the present disclosure.

Figure 10:
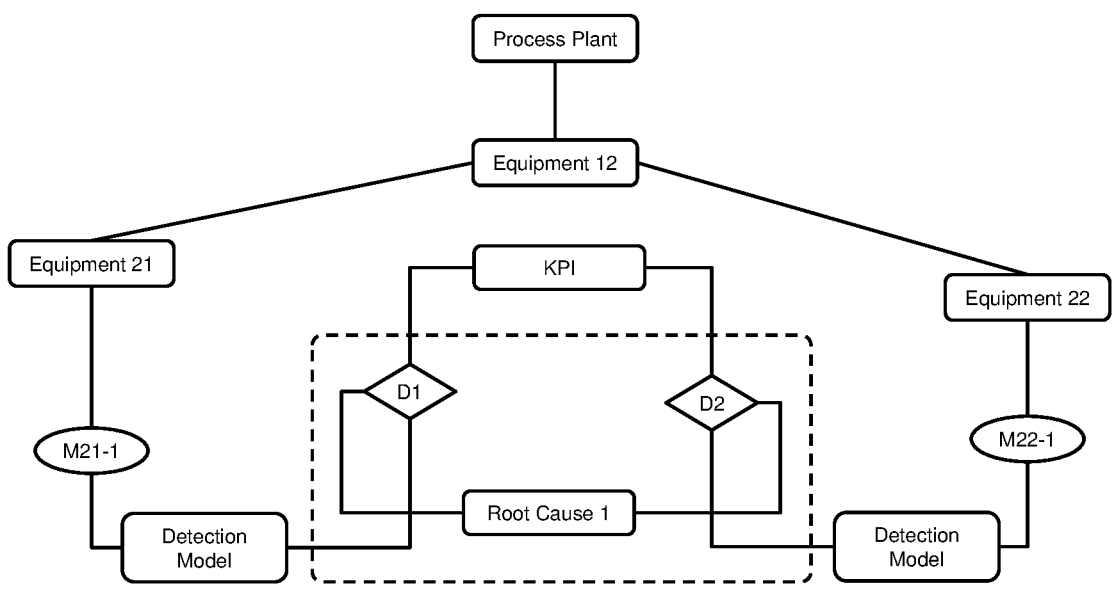

FIG. 10 illustrates a unit knowledge of root cause, in accordance with some embodiments of the present disclosure.

Figure 1:
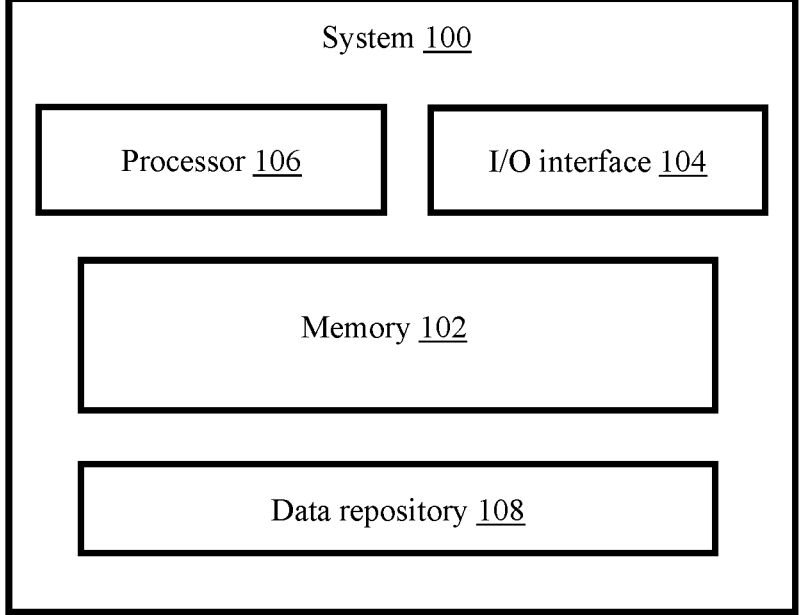
FIG. 1 illustrates a system diagram for curation and representation of root cause knowledge into computer readable format according to some embodiments of the present disclosure.

FIG. 11 depicts a method for real-time root cause analysis using the system of FIG. 1, in accordance with an embodiment of the present disclosure.

DETAILED DESCRIPTION OF EMBODIMENTS

Exemplary embodiments are described with reference to the accompanying drawings. In the figures, the left-most digit(s) of a reference number identifies the figure in which the reference number first appears. Wherever convenient, the same reference numbers are used throughout the drawings to refer to the same or like parts. While examples and features of disclosed principles are described herein, modifications, adaptations, and other implementations are possible without departing from the scope of the disclosed embodiments.

Embodiments herein provide methods for curation and representation of root cause knowledge into computer readable format and a system for real time root cause analysis. Systems developed for root cause analysis in real time need two sets of information. One of them is knowledge of the root cause for a given process in a computer implementable format and another one is real time detection of failures as soon as they occur or as the systems show or indicate a tendency towards failure through information coming from sensors. Conventionally, the detection of the failure is generally carried out through models such as simple comparison of the value with limits, physics based models, data based models, fuzzy logic or rules in real time while root cause knowledge need to be available at the time of development of the system itself. A part of this knowledge may be provided by original equipment manufacturer (OEM) while remaining part is captured by human operators during past operations or maintenance. The knowledge is often captured in logbooks or simple documents and cannot be readily used in computer for carrying out root cause analysis in real time. Thus, the present disclosure provides a method to systematically represent knowledge of root cause analysis to be readily implemented in systems developed for real-time root cause analysis. In other words, the method of the present disclosure systematically curate knowledge of industrial process(es) such as manufacturing process from various documents and prepare/generate process ontology. Further, the method includes curation of knowledge of various failure modes and their root causes and development of relevant ontology. Furthermore, graphs, of process knowledge and root causes capturing complete ontology of the process and all possible failure modes in the process, are created. The created graphs are further converted into pseudo computer codes which are readily implemented in computer (as machine readable and/or interpretable codes) and executed to carry out root cause analysis in real time. The created graphs also help in identifying conflicting knowledge or redundant knowledge of the root cause. The root cause graph represents detection and root cause associated with each detection and their states. Now if same set of detections and their states also connected with any other root cause then this will be a case of redundant root cause. Similarly, if two different set of detections with their states are connected to same root cause then it will be a case of conflicting root cause. These redundancy conflicts can be easily seen once root cause knowledge is represented in a graph format. Further, the systems of the present disclosure are designed to carry out root cause analysis as soon as a failure occurs or as the systems show or indicate a tendency towards failure. Development and execution of such systems need primarily two things. First thing is the knowledge of all possible root causes in advance in a computer interpretable format and secondly it would require a trigger for root cause analysis (RCA) when a failure occurs or system is tending towards a possible failure. The trigger for RCA may be created through appropriately processing sensor data for various parameters. Thus, the method of the present disclosure represents failure mode and root cause knowledge along with process equipment and sensor knowledge. The method of the present disclosure is also capable of highlighting redundant and conflicting knowledge. Moreover, knowledge captured using method of the present disclosure can be readily used to implement in any computer system to carryout failure mode and root cause analysis in real time.

In an embodiment, words 'process' and 'method' can be used interchangeably. In another embodiment, the words 'process' and 'method' may have different meaning, wherein the method may refer to the method of the present disclosure to carry out complete solution and process may refer to a part of the method.

Referring now to the drawings, and more particularly to FIGS. 1 through 10, where similar reference characters denote corresponding features consistently throughout the figures, there are shown preferred embodiments and these embodiments are described in the context of the following exemplary system and/or method.

FIG. 1 illustrates a system diagram for curation and representation of root cause knowledge into computer readable format according to some embodiments of the present disclosure. The system 100 includes or is otherwise in communication with one or more hardware processors such as a processor 106, an I/O interface 104, at least one memory such as a memory 102. The processor 106, the I/O interface 104, and the memory 102, may be coupled by a system bus.

The I/O interface 104 may include a variety of software and hardware interfaces, for example, a web interface, a graphical user interface, and the like. The interfaces 104 may include a variety of software and hardware interfaces, for example, interfaces for peripheral device(s), such as a keyboard, a mouse, an external memory, a camera device, and a printer. The interfaces 104 can facilitate multiple communications within a wide variety of networks and protocol types, including wired networks, for example, local area network (LAN), cable, etc., and wireless networks, such as Wireless LAN (WLAN), cellular, or satellite. For the purpose, the interfaces 104 may include one or more ports for connecting a number of computing systems with one another or to another server computer. The I/O interface 104 may include one or more ports for connecting a number of devices to one another or to another server.

The hardware processor 106 may be implemented as one or more microprocessors, microcomputers, microcontrollers, digital signal processors, central processing units, state machines, logic circuitries, and/or any devices that manipulate signals based on operational instructions. Among other capabilities, the hardware processor 106 is configured to fetch and execute computer-readable instructions stored in the memory 102.

The memory 102 may include any computer-readable medium known in the art including, for example, volatile memory, such as static random access memory (SRAM) and dynamic random access memory (DRAM), and/or nonvolatile memory, such as read only memory (ROM), erasable programmable ROM, flash memories, hard disks, optical disks, and magnetic tapes. In an embodiment, the memory 102 includes a data repository 108 for storing data processed, received, and generated by the one or more hardware processors 106.

The data repository 102, amongst other things, includes a system database and other data. The system database may store the root cause knowledge of the industrial processes. The other data may include data generated as a result of the execution of the one or more hardware processors 106.

In an embodiment, the system 100 of the present disclosure can be configured to reduce the manual intervention. A detailed description of the above-described systems and methods for curation and representation of root cause knowledge into computer readable format and creation of root cause path in real time with recommendation is shown with respect to illustrations represented with reference to FIGS. 1 through 10 and use case examples.

Figure 2:
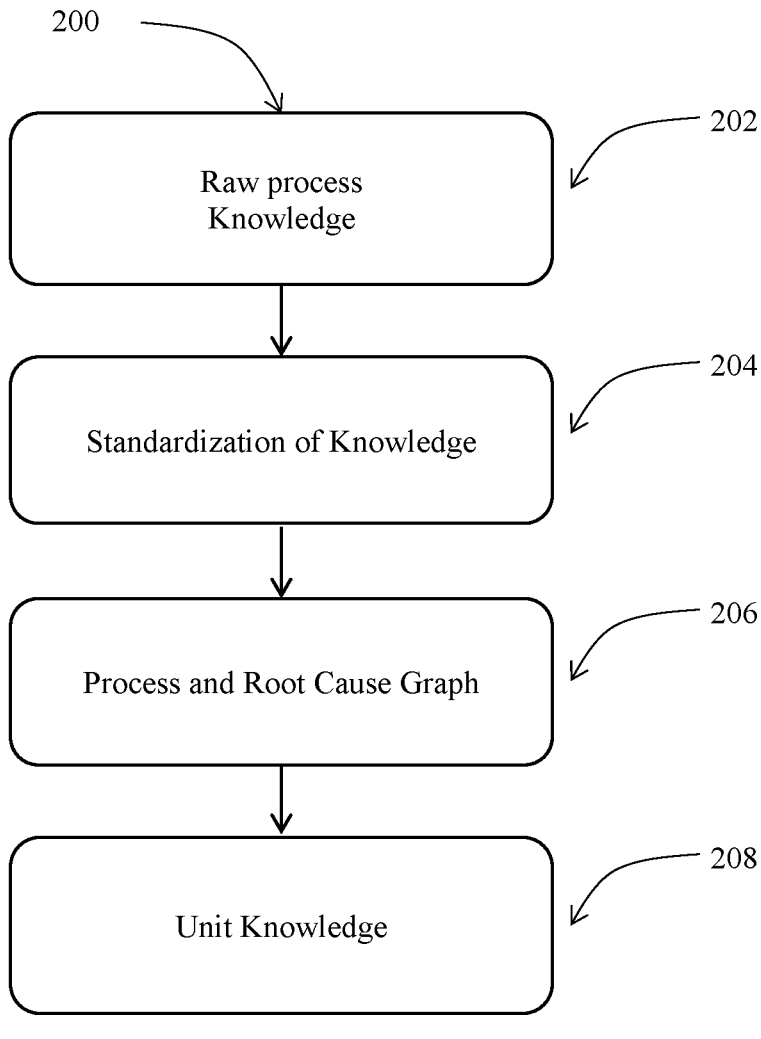
FIG. 2 is a flow diagram illustrating a processor implemented method for curation and representation of root cause knowledge into computer readable format in accordance with some embodiments of the present disclosure.

FIG. 2, with reference to FIG. 1, is an exemplary flow diagram of a processor implemented method 200 for curation and representation of root cause knowledge into computer readable format, using the one or more hardware processors of FIG. 1, in accordance with some embodiments of the present disclosure. The steps of the method 200 will now be explained in detail with reference to the components of the system 100 of FIG. 1.

Figure 3:
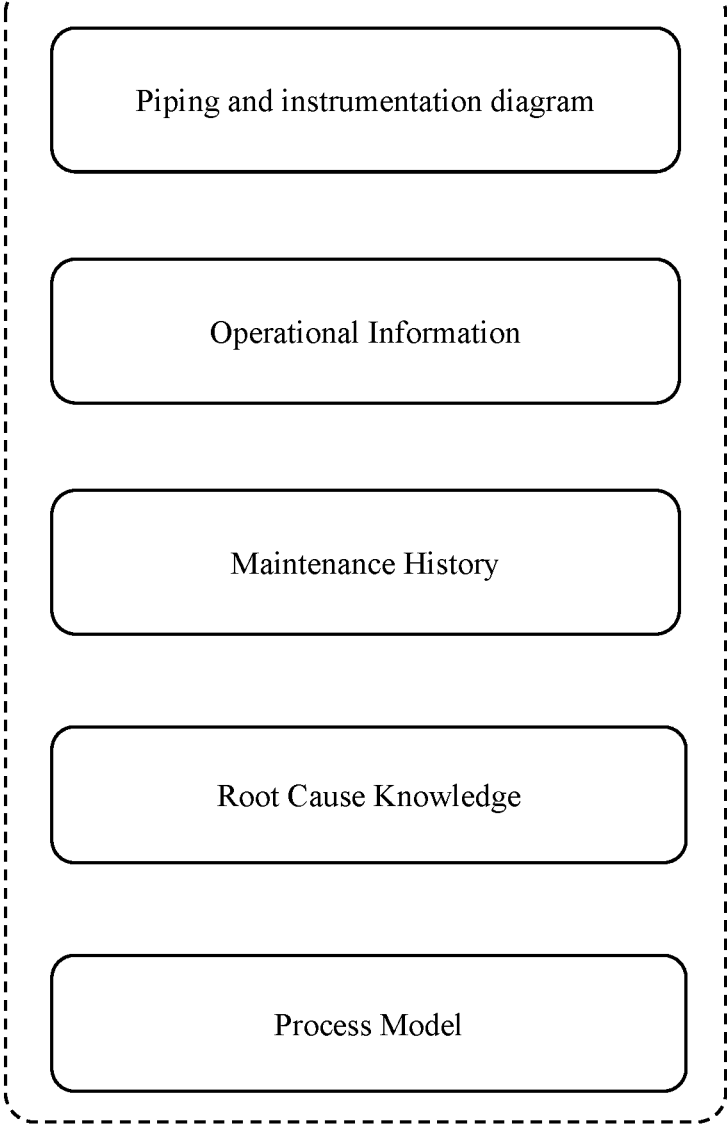
FIG. 3 illustrates a block diagram of indicative sources of raw knowledge of the process, in accordance with some embodiments of the present disclosure.

Referring to FIG. 2, at step 202, the one or more hardware processors are configured to receive knowledge of at least one process from a plurality of processes pertaining to one or more industrial applications in raw form. The knowledge of the at least one process in raw form represents knowledge of the process equipment and failure mode and root cause analysis. In an embodiment, this raw process knowledge is formed using a plurality of sources that are required for root cause analysis in case of a failure in the process. More specifically, at step 202, the one or more hardware processors 106 obtain information pertaining to one or more industrial processes, the industrial processes being executed by one or more equipment specific to a domain. The information comprises piping and instrumentation diagram (PID), operational data, maintenance history, root cause knowledge, and a corresponding process model, and wherein the root cause knowledge is based on the PID, the operational data, the maintenance history, and the process model, in one embodiment of the present disclosure. FIG. 3 illustrates a block diagram of indicative sources of raw knowledge of the process, in accordance with some embodiments of the present disclosure. As can be seen in FIG. 3 and as mentioned above, the raw process knowledge for a power plant includes piping and instrumentation diagram, operational information, maintenance history, failure knowledge and process model. The piping and instrumentation diagram comprise details of the piping and instrumentation of the entire power plant. The operational information comprises details of operation of the power plant. The maintenance history comprises reports on maintenance of the entire power plant or equipment of the power plant. The failure knowledge comprises knowledge about failure of various equipment and sub-equipment and mitigation procedure. The process model comprises a plurality of models including physics-based model(s) or data-based model(s) such as machine learning model, feature extraction, or combinations thereof (e.g., hybrid model).

Figure 4:
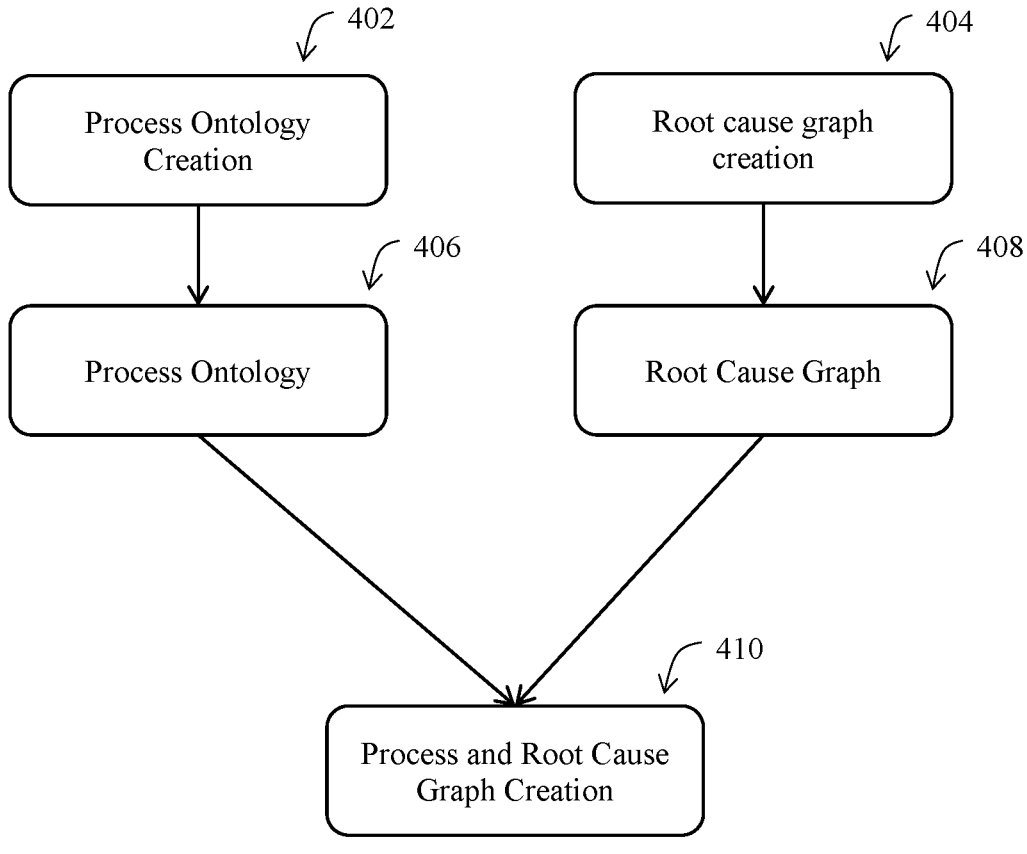
FIG. 4 illustrates a flow diagram depicting standardization mechanism for process and root cause analysis knowledge, in accordance with some embodiments of the present disclosure.
Figure 5:
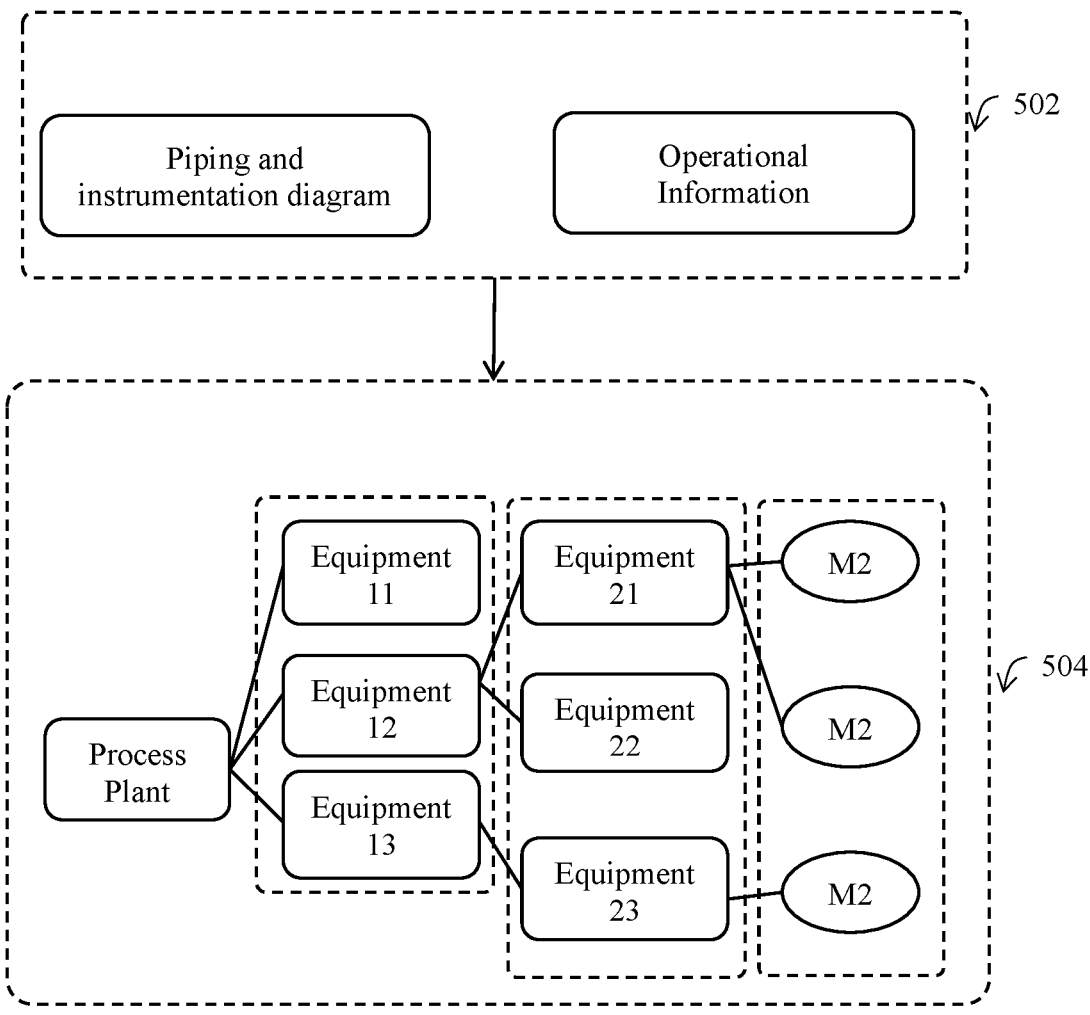
FIG. 5 illustrates a flow diagram depicting step of process ontology creation, in accordance with some embodiments of the present disclosure.

Further, as depicted in step 204 of FIG. 2, the one or more hardware processors 106 are configured to perform standardization of received raw process knowledge by converting all the knowledge available for the process and root cause and into a standard format such as in ontology format. FIG. 4 illustrates a flow diagram depicting standardization mechanism for process and root cause analysis knowledge, in accordance with some embodiments of the present disclosure. The standardization of knowledge is a process of creating a root cause graph using process knowledge in raw form. As can be seen in FIG. 4, at step 402, a step of process ontology creation is performed using the process knowledge in raw form. For instance, the process knowledge in raw form such as piping, and instrumentation diagram and operational Information are used in the process ontology creation. Further as depicted in FIG. 4, at step 406, the step of process ontology creation involves creation of a process ontology. In process ontology creation, physical structure of the process along with various measurements is captured as per their relations with respect to the process itself called process ontology. The process ontology uniquely captures information pertaining to each equipment and sub-equipment of the process including various process and quality measurements at various locations. FIG. 5 illustrates a flow diagram depicting step of process ontology creation, in accordance with some embodiments of the present disclosure. The step of process ontology creation is carried out using process ontology input as depicted in step 502 of FIG. 5. The process ontology input includes piping and instrumentation diagram and operational information. The knowledge of the layout and process of the plant is taken from piping and instrumentation diagram and operational information and converted into process ontology. Further, as depicted in step 504 of FIG. 5, the process ontology captures information of all equipment and sub-equipment with relations such as "process", "subProcess", "equipment" and hence is more powerful than a simple tree format or any other format of representing a real system in computer. In the example flow diagram as shown in FIG. 5, the process ontology includes process plant for which ontology need to be created. The process ontology further captures various equipment present in the process plant such as Equipment 11, Equipment 12, Equipment 13, and the like. After capturing information of all the equipment of the process plant, various sub-equipment such as equipment 21, equipment 22, and equipment 23 are captured. In an embodiment, the expression 'equipment' may be referred to a machine, device, system, and the like. In another embodiment, the expression 'sub-equipment' may also be referred as machine, device, system, and the like. In further embodiment, the expression 'sub-equipment' may also refer to a component/machine/device (e.g., equipment 'B') that is either an integral part of the equipment (e.g., equipment A) or externally connect to the equipment A. In another embodiment, expressions 'equipment' and 'sub-equipment' may be interchangeably used herein. The process of capturing information is continued till information of entire process plant with all required details are captured. The process ontology also captures various sensors (or sensory information) that may be present in the process plant for measuring process and quality parameters. Additionally, process and quality parameters measurement can be done by operator as well. The step of creation of process ontology from process ontology input such as piping, and instrumentation diagram and operational information may be created by those experts in the field (domain knowledge) or can be instantiated by ontological meta models created for process plant, in one example embodiment of the present disclosure. In an embodiment, the process represented in process ontology form can be easily implemented in computers (or computing system such as the system 100) and can be used for carrying out many knowledge mining and reasoning such as root cause analysis.

Further, at step 404 of FIG. 4, a step of cause and failure graph creation is performed using the raw process knowledge. The process knowledge in raw form such as maintenance history, failure knowledge and process model are used in cause and failure graph creation to create cause and failure graph at depicted in step 408 of FIG. 4. In an embodiment, the cause and failure graph capture all possible root cause and its effect during the operation of the process. The cause and failure graph also list out various detections that are observed in case of failures along with actions to mitigate the effects of the failure.

Figure 6:
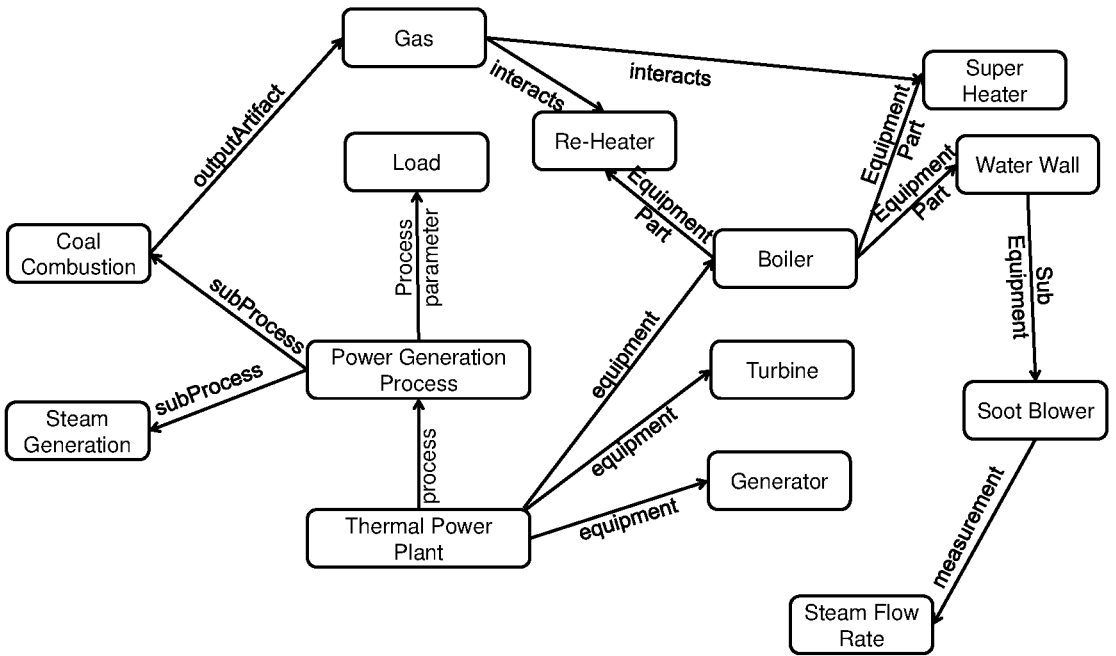
FIG. 6 illustrates a use case example of process ontology creation, in accordance with some embodiments of the present disclosure

FIG. 6 illustrates a use case example of process ontology creation, in accordance with some embodiments of the present disclosure. In an embodiment, partial ontology of a typical power generation process in a thermal power plant is illustrated with the help of FIG. 6. As shown in FIG. 6, the thermal power plant has a process known as power generation process. The power generation process further has a sub-process such as coal combustion steam generation. The power generation process also has process parameter such as load. During operation of the thermal power plant, the thermal power plant generates the load through the power generation process. The power generation process starts with coal combustion through the sub-process. The coal combustion produces an output artifact such as a gas.

The thermal power plant comprises equipment such as boiler, turbine, generator, and the like. The boiler further comprises equipment part such as a super heater, a water wall and the like. Maximum conversion of water into steam happens in the water wall. The water wall further comprises sub-equipment such as a soot blower. Job of the soot blower is to remove deposition on surfaces of the water wall. The soot blower comprises a measurement parameter which is steam flow rate. The value of steam flow rate gives an indication of working of the soot blower.

In operation, the gas which is an output artifact of the sub process coal combustion first interacts with the super heater to convert steam into a super-heated steam. The super-heated steam is then passed to the turbine to convert steam energy into mechanical energy. Steam coming out of the boiler is passed to a re-heater. The gas further interacts with the re-heater to further add energy into the steam. This steam is also sent to the turbine to convert the steam energy into the mechanical energy.

Figure 7:
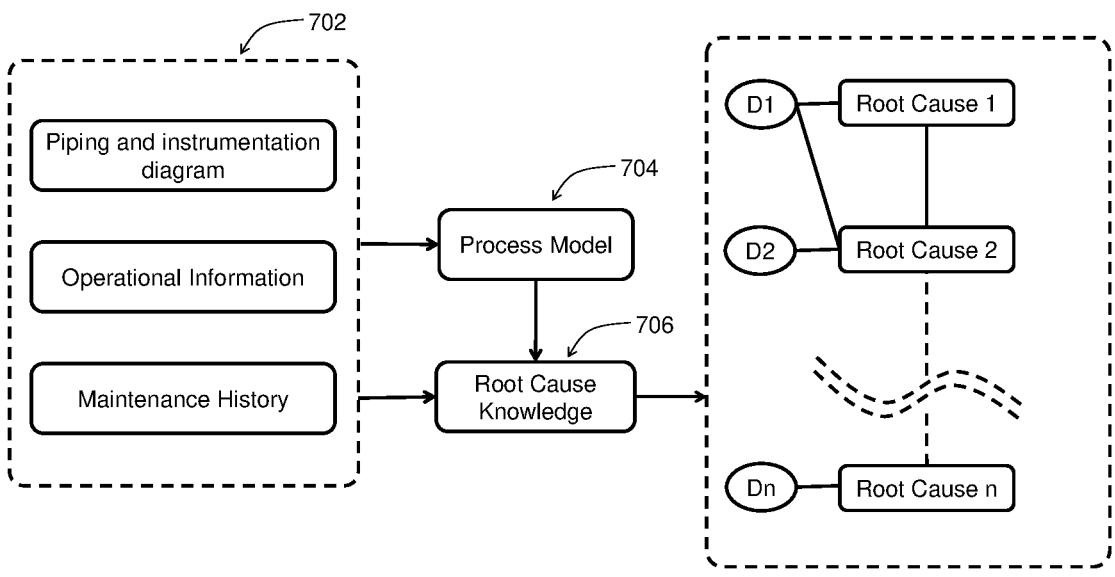
FIG. 7 illustrates a flow diagram depicting step of root-cause graph creation, in accordance with some embodiments of the present disclosure.

Referring back to FIG. 2, at step 206, the one or more hardware processors 106 are configured to create a process and root cause graph. As can be seen in FIG. 4, at step 410, the process ontology and cause and failure mode graph are further used in root cause graph creation to create a root cause graph. FIG. 7 illustrates a flow diagram depicting step of root-cause graph creation, in accordance with some embodiments of the present disclosure. As depicted in step 702 of FIG. 7, the root cause graph creation utilizes root cause knowledge inputs for the creation of root cause graph. In an embodiment, the root cause knowledge inputs include one or more of piping and instrumentation diagram, operational information, maintenance history, domain knowledge, and root cause knowledge. The maintenance history comprises information such as performance issues, failure details, observations, and/or impending failure details of the one or more equipment and/or industrial processes. The maintenance history further comprises actions taken for repair, mitigation, containment of the equipment/industrial processes, and controlling thereof. The piping and instrumentation diagram contain information of the piping and instrumentation of the entire plant in great details. This is used to extract list of equipment and sub-equipment along with measurement details that may be present in the process plant. The operational information gives details of the operation of the various equipment and sub-equipment of the process plant. These details are used to generate root cause graph. The process and root cause graph and root cause knowledge provide knowledge of the root cause graph in great details. This knowledge may be used to generate root cause knowledge in the standard form. Alternatively, root cause knowledge may also be generated using a process model. The process model as mentioned above may be a data-based model, a physics-based model, an empirical model or a hybrid model, in one embodiment of the present disclosure. More specific examples of such models include machine learning model, feature extraction-based model, and the like. The process model on execution may generate entire root cause knowledge with various scenarios of failure using what if analysis or any other analysis suitable for the purpose to create scenario of failures.

The root cause graph is a hierarchical representation of root cause that may occur in the process during the operation of the plant. As shown in step 704 of FIG. 7, root cause path may contain number of intermediate root cause(s). As can be seen in FIG. 7, each root cause in the entire root cause chain may have one or more than one detection represented by D1, D2, . . . , Dn. The root cause knowledge is used to generate root cause graph. The root cause graph is graphical representation of the root cause knowledge and represented as unit knowledge 208 (refer FIG. 2). The root cause graph contains a plurality of root causes and detections. Each root cause is connected to another root cause and each root cause is supported by one or more than one detection. The root cause graph represents a very small part of the root cause graph that may be there in real process plant. The root cause graph further contains root cause 1, root cause 2 and root cause n along with detection D1, detection D2 and detection Dn, in one example embodiment of the present disclosure. There could be several intermediate root causes, in another example embodiment of the present disclosure. As can be seen in FIG. 7 that the root cause 1 has detection D1 while root cause 2 has both detection D2 and detection D1. Finally, the leaf level root cause n has detection Dn. The root cause n is last root cause in the graph shown in FIG. 7 and hence it is termed as leaf-level root cause. The very first root cause is one of the performance indicators (PIs) of the process plant. The root cause graph is visual representation of the root cause along with process and equipment knowledge, in one embodiment of the present disclosure. The root cause graph is created by combining knowledge from both process ontology and cause and failure mode graph. This combination has number of advantages including but not limited to easy implementation in computer, passing detections from ontology to root cause uniquely, identification of duplicate knowledge and the like. The root cause graph represents detection and root cause associated with each detection and their states. Now if same set of detections and their states also connected with any other root cause then this will be a case of redundant root cause. Similarly, if two different set of detections with their states are connected to same root cause then it will be a case of conflicting root cause. These redundancy conflicts can be easily seen once root cause knowledge is represented in a graph format. Further, the root cause path created for the current detection may be achieved by recursively travelling across the root cause graph or any suitable method as known in the art such as nested for loops or nested while loops in one example embodiment.

Figure 8:
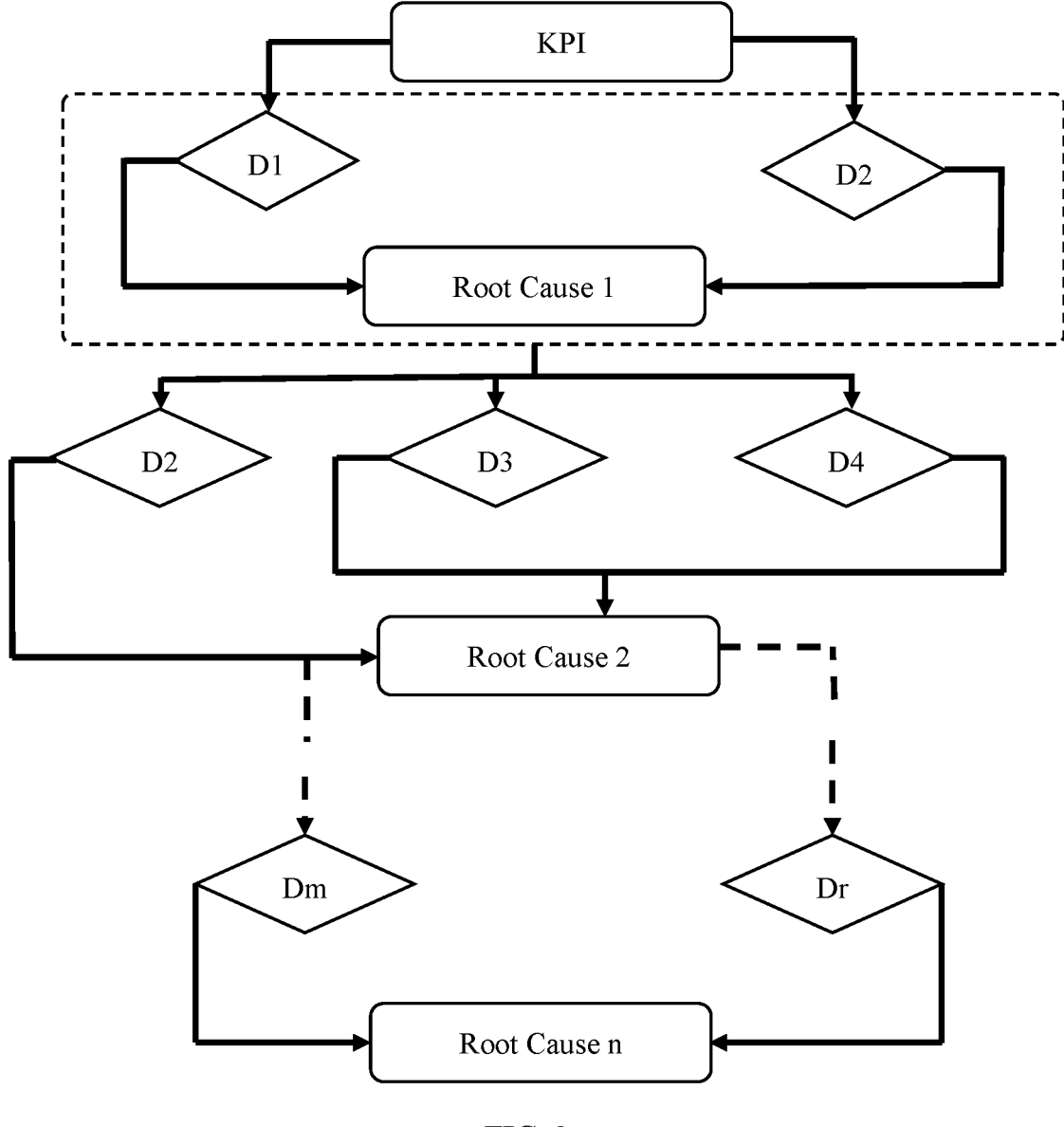
FIG. 8 illustrates root cause graph along with binary detection, in accordance with some embodiments of the present disclosure.

FIG. 8 illustrates root cause graph and process graph with details of detection, in accordance with some embodiments of the present disclosure. The root cause graph as shown in FIG. 8 includes binary detection as an example of detection as discussed in FIG. 7. The binary detection can represent two ways in which a detection may deviate during operation of the process plant. The modified root cause graph conveys more meaning of the detection and root cause. This also becomes a back-bone of the representation of the root cause graph and process ontology in computer for real time execution. The root cause graph as shown in FIG. 8 comprises a performance indicator as shown in step 802. The performance indicator is one important parameter for operation of the process plant. The performance indicator may also be used as a trigger when used for real time root cause finding and any failure detection in real-time. Further deviation in performance indicator may give rise to binary detection D1 and binary detection D2. These detections may be either a positive detection or a negative detection. Further, positive detection is indicative of yes, true, high, or observed, while negative detection is indicative of no, false, low or not observed, in one example embodiment. In one example positive detections are associated with the right corner of the detection symbol and negative detections are associated with left corner of the detection symbol. Combination of these detections results into root cause 1. The root cause 1 further results into binary detection D2, binary detection D3 and binary detection D4. These detections in-turn confirm root cause 2 as next level root cause. This process continues with several layers until a root cause n comes such that there is no further detection caused by the root cause. The root cause n may have binary detection Dm and binary detection Dr as detection. In one embodiment, it is assumed that the root cause n represents the actual root cause that has caused deviation in the performance indicator. On fixing this root cause n, the deviation in performance indicator is likely to come back in normal operation range. Further, corrective action taken to rectify the root cause n is captured in root cause graph (not shown in the figure) for each root cause. To make root causes path meaningful and easy to take corrective action or maintenance, all the root causes after PI (performance indicator or any other parameter that corresponds to performance of an industrial process in an industry plant) are arranged in levels. Root cause at level 1 are those root causes that are directly affected by the deviation in PI. Similarly, those in level 2 are directly affected by those in level 1 and so on. The leaf level root causes are those which are the actual root cause. Arrangements of root cause in different levels are shown in Root cause and Process Graph as depicted in FIG. 8 of the present disclosure. They are created with the help of root cause knowledge and ontology of the process (also referred as process ontology).

FIG. 9 illustrates a flow diagram depicting step of binary detection, in accordance with some embodiments of the present disclosure. It is evident in step 904 of FIG. 9 that the binary detection is represented in diamond shape, wherein each of the corner of the diamond has a specific meaning. Two horizontal corners of the diamond represent two-states of the detections namely positive detection port and negative detection port. Top corner of the diamond represents root cause-detection port and bottom corner represents a measurement-detection port. Further, the root cause as depicted in step 902 of FIG. 9 decides whether binary detection needs to be checked for its value in-order to carry out root cause path or not. This information from step 902 of FIG. 9 is passed to binary detection via knowledge from root cause connection. The binary detection as shown in step 904 of FIG. 9 may be connected to one or more than one root cause through knowledge from root cause above. The bottom corner of the binary detection namely measurement-detection port takes value of the detection through a measurement as shown in step 908 of FIG. 9. This measurement is unique, and it has got specific meaning attached to it which is captured though process ontology. As shown in step 910 of FIG. 9, the measurement (M21-1) is attached to sub-equipment which in-turn is attached to equipment which is a part of process plant. The measurement (M21-1) cannot be used directly for binary detection. The measured value needs to be processed first to get the knowledge of binary detection. For this purpose, as depicted in step 906 of FIG. 9, a detection model is used to process information from the measurement (M21-1) before passing it to the binary detection in measurement-detection port. Detection knowledge from the detection model is then passed to the measurement-detection port via a detection information. In an embodiment, the binary detection comprises complete hierarchical knowledge of the root cause along with complete knowledge of detection information through process ontology. Such representation of binary detection can easily be codified in computers and used for real time root cause detection.

Referring back to FIG. 2, at step 208, the one or more hardware processors 106 provide a unit knowledge graph by combining normal root cause graph with normal detections and modified root cause graph with binary detections. The unit knowledge graph representing entire knowledge of the root cause is converted into a pseudo code which can be easily implemented in computer for real time analysis of root cause. FIG. 10 illustrates a unit knowledge of root cause, in accordance with some embodiments of the present disclosure. As depicted in FIG. 10, the unit knowledge of root cause is shown within dotted lines. The unit knowledge of root cause further contains binary detection D1 and binary detection D2 along with root cause 1. The detection knowledge to binary detection D1 is coming from measurement M21-1 through detection model. The measurement M21-1 is uniquely captured through its position via sub-equipment 21 and equipment 12 in the process plant. Similarly, the detection knowledge to binary detection D2 coming from measurement M22-1, is uniquely captured through its position via sub-equipment 22 and equipment 12 in the process plant. The detections of binary detection D1 and binary detection D2 confirm root cause 1 to be next level root cause.

In one embodiment pseudo code of unit knowledge/root cause path is provided below as:

IF
    Process Plant->Equipment 12->Equipment 21->M21-1-
        >D1=NEGATIVE AND
    Process Plant->Equipment 12->Equipment 22->M22-1-
        >D2=POSITIVE THEN
    KPI->Root Cause 1=TRUE.

In the above-mentioned pseudo code of unit knowledge "->" sign represents property relation between two items of the process ontology and value after "=" sign represents the detection corresponding to the measurements M21-1, M22-1 and so on. The pseudo code of unit knowledge is textual representation of unit knowledge of the root cause or the root cause path. The value of detection attached to process ontology gets its value from the measurement through detection model. This value of the detection may be either positive or negative. Positive values are represented through positive detection port and negative values are represented through negative detection port. Therefore, just by looking/observing at the connections in the binary detection, it is clear whether value of the detection is either positive or negative. As binary detection D1 and binary detection D2 lead to root cause 1, this can be codified as root cause true. Further, positive detection may include yes, true, high or observed while negative detection may include no, false, low or not observed.

FIG. 11, with reference to FIGS. 1 through 10, depicts a method for real-time root cause analysis using the system 100 of FIG. 1, in accordance with an embodiment of the present disclosure. At step 1102 of the present disclosure, the one or more hardware processors 106 obtain information pertaining to one or more industrial processes being executed by one or more equipment, wherein the one or more equipment may be deployed in any industry plant (e.g., power/energy plant, manufacturing plant, automotive plant, oil and gas industry plant, and the like). It is to be understood by a person having ordinary skill in the art or person skilled in the art that examples of such industrial plants and equipment as described above in the detailed description and depicted via figures from FIGS. 1 through 11, shall not be construed as limiting the scope of the present disclosure. In an embodiment, the information comprises piping and instrumentation diagram (PID), operational data, maintenance history, root cause knowledge, and a corresponding process model as depicted in FIGS. 3 and 7. In an embodiment, the root cause knowledge is based on the PID, the operational data, the maintenance history, domain knowledge and the corresponding process model as depicted in FIG. 7 of the present disclosure. The corresponding process model is at least one of a data-based model, a physics-based model, an empirical model, and a hybrid model, in an embodiment of the present disclosure.

At step 1104 of the present disclosure, the one or more hardware processors 106 generate, via one or more meta models executed by the one or more hardware processors, a process ontology using the obtained information (e.g., refer information obtained at step 1102). In an embodiment, the generated process ontology comprises information pertaining to one or more of (i) the one or more equipment, (ii) a corresponding location of one or more sensors deployed within the one or more equipment, (iii) sensory information captured through the one or more sensors thereof, (iv) details specific to an interaction between at least one of (a) the one or more equipment and (b) the one or more industrial processes, (v) one or more parameters of the one or more industrial processes, or (vi) one or more action plans, one or more detection states, and wherein the one or more action plans comprise one or more of repair, mitigation, containment, or control of at least one of the one or more industrial processes and the one or more equipment. In one embodiment, the action plans can be communicated to a controller which can perform these actions such as repair, mitigate, contain and/or control the equipment/industrial process(es). In an embodiment of the present disclosure, the one or more hardware processors 106 generate the process ontology with the help of human experts or subject matter experts (SME). The SME provides one or more inputs in generating the process ontology, wherein the inputs may comprise the information pertaining to (i) the one or more equipment and (ii) corresponding location of one or more sensors deployed within the one or more equipment, (iii) sensory information captured through the one or more sensors thereof, (iv) details specific to an interaction between at least one of (a) the one or more equipment and (b) the one or more industrial processes. In an embodiment, the one or more sensors comprise one or more of soft sensors (software sensors) or hardware sensor(s). In an embodiment, soft sensor (or virtual sensor) is an expression for software where several measurements are processed together. The interaction of the signals between soft sensors or equipment can be used for calculating new quantities that (i) needs to be measured and/or (ii) need not be measured. Soft sensors are useful in data fusion, where measurements of different characteristics and dynamics are combined. It can be used for fault diagnosis (or impending failure detections) as well as control applications. Hardware sensors or hard sensors are referred to sensors that are either integral part of the equipment or attached as a component to the equipment to measure various parameters corresponding to performance of the equipment. Examples of such parameters include one or more of velocity estimation (estimated by a velocity sensor), quality estimation (estimated by quality estimation sensor), pressure/force (estimated by pressure or force sensor), temperature (estimated by temperature sensor), density (estimated by density sensor), and the like. Such examples of sensors shall not be construed as limiting the scope of the present disclosure and shall vary depending upon industrial processes being monitored across plants for real-time root cause analysis.

At step 1106 of the present disclosure, the one or more hardware processors 106 transform the root cause knowledge to a set of machine instructions (also referred as machine instructions). In an embodiment, the set of machine instructions comprise an associated detection state. A logic in the set of machine instructions is derived from the root cause knowledge. In an embodiment, the one or more detections are identified through a detection model using data captured in real time by the one or more sensors (e.g., soft sensors or hardware sensors). The information from the one or more sensors (captured in real-time) is mapped to the process ontology. In an embodiment of the present disclosure, derivation of the logic from the root cause graph is better understood by way of the following non-construing example. In one example, referring to block in dotted line in FIG. 8, the Root Cause 1 has detection D1 and D2. In the FIG, the detection D1 is in negative state whereas detection D2 has positive state. Now taking help of the ontology detection D1 is written in pseudo code as "Process Plant->Equipment 12->Equipment 21->M21-1->D1" as state of detection D1 is negative then this information is written as "Process Plant->Equipment 12->Equipment 21->M21-1->D1=NEGATIVE". Similarly, detection D2 along with its state is written as "Process Plant->Equipment 12->Equipment 22->M22-1->D2=POSITIVE". The Root Cause 1 has detection D1 and D2 only, so their combination along with their state is written as "Process Plant->Equipment 12->Equipment 21->M21-1->D1=NEGATIVE AND Process Plant->Equipment 12->Equipment 22->M22-1->D2=POSITIVE". These states are tested for its value and if the combined statement is TRUE then only the "Root Cause 1" is TRUE.

Referring to steps of FIG. 11, at step 1108 of the present disclosure, the one or more hardware processor 106 generate a root cause path comprising one or more root causes and associated interdependencies (e.g., also referred as 'intermediate root causes and interchangeably used herein) using (i) the process ontology and (ii) the root cause knowledge. The one or more root causes are detected using the detection model, in one example embodiment of the present disclosure. In an embodiment, the root cause path further comprises one or more actions to be executed (e.g., corrective measures to be taken by a SME or an operator of the industrial processes). The detection model is at least one of a data-based model, a physics-based model, a pattern identification model, an empirical model, and a hybrid model, in one embodiment of the present disclosure. The one or more hardware processors 106 further generate a root cause graph using the process ontology and the root cause knowledge. In other words, the root cause graph is a representation of the process ontology and the root cause knowledge. The root cause graph comprises one or more corresponding root causes detected using the detection model. In an embodiment, a first root cause comprised in the root cause graph is indicative of a performance indicator (PI) or any performance parameter corresponding to the one or more industrial processes. One or more root causes in the root cause graph (or root cause knowledge) are hierarchical arranged after one or more PIs in the root cause graph. In other words, once the PIs are represented in the root cause graph/knowledge the one or more root causes are arranged at all levels in the root cause graph. In an embodiment, the root cause graph is represented in at least one of a tree representation format, a tabular representation format, a graphical representation format and/or an unstructured representation format. Further, the one or more corresponding root causes are detected based on a unique combination of one or more detections and the associated detection state thereof, using the detection model. FIG. 8 and its description depict the one or more corresponding root causes being detected based on a unique combination of one or more detections and an associated detection state thereof, using the detection model (e.g., refer FIG. 10). In an embodiment, the associated detection state is at least one of a positive detection state and a negative detection state as depicted in FIG. 8. Detection states D1 and D2 for root cause 1 correspond to the positive detection state and the negative detection state respectively. In an embodiment, the detection model is at least one of a data-based model, a physics-based model, a pattern identification model, an empirical model, and a hybrid model.

The written description describes the subject matter herein to enable any person skilled in the art to make and use the embodiments. The scope of the subject matter embodiments is defined by the claims and may include other modifications that occur to those skilled in the art. Such other modifications are intended to be within the scope of the claims if they have similar elements that do not differ from the literal language of the claims or if they include equivalent elements with insubstantial differences from the literal language of the claims.

It is to be understood that the scope of the protection is extended to such a program and in addition to a computer-readable means having a message therein; such computer-readable storage means contain program-code means for implementation of one or more steps of the method, when the program runs on a server or mobile device or any suitable programmable device. The hardware device can be any kind of device which can be programmed including e.g. any kind of computer like a server or a personal computer, or the like, or any combination thereof. The device may also include means which could be e.g. hardware means like e.g. an application-specific integrated circuit (ASIC), a field-programmable gate array (FPGA), or a combination of hardware and software means, e.g. an ASIC and an FPGA, or at least one microprocessor and at least one memory with software processing components located therein. Thus, the means can include both hardware means and software means. The method embodiments described herein could be implemented in hardware and software. The device may also include software means. Alternatively, the embodiments may be implemented on different hardware devices, e.g. using a plurality of CPUs.

The embodiments herein can comprise hardware and software elements. The embodiments that are implemented in software include but are not limited to, firmware, resident software, microcode, etc. The functions performed by various components described herein may be implemented in other components or combinations of other components. For the purposes of this description, a computer-usable or computer readable medium can be any apparatus that can comprise, store, communicate, propagate, or transport the program for use by or in connection with the instruction execution system, apparatus, or device.

The illustrated steps are set out to explain the exemplary embodiments shown, and it should be anticipated that ongoing technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope of the disclosed embodiments. Also, the words "comprising," "having," "containing," and "including," and other similar forms are intended to be equivalent in meaning and be open ended in that an item or items following any one of these words is not meant to be an exhaustive listing of such item or items, or meant to be limited to only the listed item or items. It must also be noted that as used herein and in the appended claims, the singular forms "a," "an," and "the" include plural references unless the context clearly dictates otherwise.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., be non-transitory. Examples include random access memory (RAM), read-only memory (ROM), volatile memory, nonvolatile memory, hard drives, CD ROMs, DVDs, flash drives, disks, and any other known physical storage media.

It is intended that the disclosure and examples be considered as exemplary only, with a true scope of disclosed embodiments being indicated by the following claims.

We claim:

1. A processor implemented method for real-time root cause analysis, comprising:

obtaining, via one or more hardware processors, information pertaining to one or more industrial processes being executed by one or more equipment in an industry plant, wherein the information comprises piping and instrumentation diagram (PID), operational data, maintenance history, root cause knowledge, and a process model, and wherein the root cause knowledge is based on the PID, the operational data, the maintenance history, and the process model, wherein the information represents knowledge of the one or more equipment, a failure mode and the root cause analysis;

receiving, via the one or more hardware processors, a process ontology, and wherein the process ontology comprises information pertaining to one or more of (i) the one or more equipment, (ii) a location of one or more sensors deployed within the one or more equipment, (iii) sensory information captured through the one or more sensors thereof, wherein the one or more sensors measure one or more parameters including a velocity estimated by a velocity sensor, a quality estimated by a quality estimation sensor, a pressure or force estimated by a pressure sensor or a force sensor, a temperature estimated by a temperature sensor, a density estimated by a density sensor, corresponding to performance of the one or more equipment, (iv) information on an interaction between at least one of (a) the one or more equipment and (b) the one or more industrial processes, (v) one or more parameters of the one or more industrial processes, or (vi) one or more action plans, and wherein the one or more action plans comprise one or more of repair, mitigation, containment, or control of at least one of the one or more industrial processes and the one or more equipment, wherein the process ontology is associated with a power generation industrial process in a thermal power plant and the power generation industrial process includes a sub-process including a coal combustion steam generation, wherein the power generation industrial process has a process parameter including a load and during operation of the thermal power plant, the thermal power plant generates the load through the power generation industrial process and the power generation industrial process starts with coal combustion through the sub-process producing gas as an output, wherein the thermal power plant comprises the one or more equipment including a boiler, a turbine, a generator, wherein the boiler further comprises equipment part including a super heater, a water wall, wherein the water wall further comprises a sub-equipment including a soot blower, and a value of a steam flow rate associated with the soot blower provides an indication of working of the soot blower;

transforming the root cause knowledge to a set of machine instructions, the set of machine instructions comprising an associated detection state of one or more detections identified through a detection model using data captured in real time by one or more sensors within the one or more equipment, wherein the associated detection state is at least one of a positive detection state and a negative detection state, wherein information from the one or more sensors is mapped to the process ontology, and wherein transforming the root cause knowledge to the set of machine instructions comprises deriving a logic in the set of machine instructions from the root cause knowledge by obtaining a pseudo code of the one or more detections along with the associated detection state;

generating, via the one or more hardware processors, a root cause path comprising one or more root causes and associated interdependencies using (i) the process ontology and (ii) the transformed root cause knowledge, and wherein the one or more root causes are detected using the detection model, each root cause being connected to at least one other root cause and each root cause having the one or more detections;

generating, via the one or more hardware processors, a root cause graph using the root cause path, wherein the root cause graph represents the one or more detections, root cause associated with each of the one or more detections, and detection state associated with each of the one or more detections, wherein the one or more root causes are detected using a binary detection based on a unique combination of the one or more detections and the associated detection state, through the detection model, wherein the root cause graph comprises a performance indicator (PI) that is used as a trigger for performing root cause analysis in real-time, wherein a first root cause comprised in the root cause graph is indicative of the performance indicator (PI) corresponding to the one or more industrial processes, wherein one or more root causes are hierarchical arranged after the first root cause in the root cause graph in a plurality of levels, wherein root causes of a level of the plurality of levels are directly affected by deviation in root causes of a previous level of the plurality of levels, wherein the root cause graph is a visual representation of the root cause along with the industrial process and equipment knowledge, wherein the root cause graph is created by combining knowledge from the process ontology and a cause and failure mode graph, and wherein combining the knowledge from the process ontology and the cause and failure mode graph enables i) passing of detections from the process ontology to the root cause uniquely and ii) identification of duplicate knowledge;

executing, via the one or more hardware processors, pseudo codes which are machine readable codes or machine instructions for performing root cause analysis, in real time, after converting the root cause graph into the pseudo codes, wherein the root cause graph enables identification of at least one of a redundant knowledge and a conflicting knowledge of each root cause associated with each of the one or more detections, wherein if a same set of detections and their corresponding detection states are connected with more than one root cause, then a case of the redundant knowledge is identified, and if two different set of detections and their corresponding detection states are connected to a same root cause, then a case of the conflicting knowledge is identified, wherein the root cause analysis is triggered based on the redundant knowledge and the conflicting knowledge of each root cause when one of a failure occurs in a system or a subsystem of the industry plant, and when the system or the subsystem in the industry plant is indicating a possible failure, and wherein a pseudo code of the pseudo codes is a textual representation of unit knowledge of a root cause or a root cause path, wherein the root cause analysis in real-time requires knowledge of the root cause for the industrial process in a computer implementable format and real-time detection of failures as soon as they occur or as the system indicates a tendency towards the failure through information coming from the one or more sensors;

communicating, via the one or more hardware processors, one or more action plans to a controller for rectifying each root cause in the root cause graph based on the root cause analysis; and executing, by the controller, one or more actions from the one or more action plans comprising one or more of repair, mitigation, containment, or control of at least one of the one or more industrial processes and the one or more equipment for rectifying each root cause in the root cause graph based on the root cause analysis, deviation in the performance indicator (PI), and the arrangement of root causes in the plurality of levels, wherein in response to rectifying the root cause, the deviation in the performance indicator returns back in normal operation range.

2. The processor implemented method of claim 1, wherein the process model is at least one of a data-based model, a physics-based model, an empirical model, and a hybrid model.

3. The processor implemented method of claim 1, wherein the detection model is at least one of a data-based model, a physics-based model, a pattern identification model, an empirical model, and a hybrid model.

4. The processor implemented method of claim 1, wherein the root cause graph is represented in at least one of a tree representation format, a tabular representation format, and a graphical representation format.

5. A system, comprising:

a memory storing instructions;

one or more communication interfaces; and one or more hardware processors coupled to the memory via the one or more communication interfaces, wherein the one or more hardware processors are configured by the instructions to:

obtain information pertaining to one or more industrial processes being executed by one or more equipment in an industry plant, wherein the information comprises piping and instrumentation diagram (PID), operational data, maintenance history, root cause knowledge, and a process model, and wherein the root cause knowledge is based on the PID, the operational data, the maintenance history, and the process model, wherein the information represents knowledge of the one or more equipment, a failure mode and the root cause analysis;

receive a process ontology, and wherein the process ontology comprises information pertaining to one or more of (i) the one or more equipment, (ii) a location of one or more sensors deployed within the one or more equipment, (iii) sensory information captured through the one or more sensors thereof, wherein the one or more sensors measure one or more parameters including a velocity estimated by a velocity sensor, a quality estimated by a quality estimation sensor, a pressure or force estimated by a pressure sensor or a force sensor, a temperature estimated by a temperature sensor, a density estimated by a density sensor, corresponding to performance of the one or more equipment, (iv) information on an interaction between at least one of (a) the one or more equipment and (b) the one or more industrial processes, (v) one or more parameters of the one or more industrial processes, or (vi) one or more action plans, and wherein the one or more action plans comprise one or more of repair, mitigation, containment, or control of at least one of the one or more industrial processes and the one or more equipment, wherein the process ontology is associated with a power generation industrial process in a thermal power plant and the power generation industrial process includes a sub-process including a coal combustion steam generation, wherein the power generation industrial process has a process parameter including a load and during operation of the thermal power plant, the thermal power plant generates the load through the power generation industrial process and the power generation industrial process starts with coal combustion through the sub-process producing gas as an output, wherein the thermal power plant comprises the one or more equipment including a boiler, a turbine, a generator, wherein the boiler further comprises equipment part including a super heater, a water wall, wherein the water wall further comprises a sub-equipment including a soot blower, and a value of a steam flow rate associated with the soot blower provides an indication of working of the soot blower;

transform the root cause knowledge to a set of machine instructions, the set of machine instructions comprising an associated detection state of one or more detections identified through a detection model using data captured in real time by one or more sensors within the one or more equipment, wherein the associated detection state is at least one of a positive detection state and a negative detection state, wherein information from the one or more sensors is mapped to the process ontology, wherein transforming the root cause knowledge to the set of machine instructions comprises deriving a logic in the set of machine instructions from the root cause knowledge by obtaining a pseudo code of the one or more detections along with the associated detection state;

generate a root cause path comprising one or more root causes and associated interdependencies using (i) the process ontology and (ii) the transformed root cause knowledge, and wherein the one or more root causes are detected using the detection model, each root cause being connected to at least one other root cause and each root cause having the one or more detections;

generate a root cause graph using the root cause path, wherein the root cause graph represents the one or more detections, root cause associated with each of the one or more detections, and detection state associated with each of the one or more detections, wherein the one or more root causes are detected using a binary detection based on a unique combination of the one or more detections and the associated detection state, through the detection model, wherein the root cause graph comprises a performance indicator (PI) that is used as a trigger for performing root cause analysis in real-time, wherein a first root cause comprised in the root cause graph is indicative of the performance indicator (PI) corresponding to the one or more industrial processes, wherein one or more root causes are hierarchical arranged after the first root cause in the root cause graph in a plurality of levels, wherein root causes of a level of the plurality of levels are directly affected by deviation in root causes of a previous level of the plurality of levels, wherein the root cause graph is a visual representation of the root cause along with the industrial process and equipment knowledge, wherein the root cause graph is created by combining knowledge from the process ontology and a cause and failure mode graph, and wherein combining the knowledge from the process ontology and the cause and failure mode graph enables i) passing of detections from the process ontology to the root cause uniquely and ii) identification of duplicate knowledge;

execute pseudo codes which are machine readable codes or machine instructions for performing root cause analysis, in real time, after converting the root cause graph into the pseudo codes, wherein the root cause graph enables identification of at least one of a redundant knowledge and a conflicting knowledge of each root cause associated with each of the one or more detections, wherein if a same set of detections and their corresponding detection states are connected with more than one root cause, then a case of the redundant knowledge is identified, and if two different set of detections and their corresponding detection states are connected to a same root cause, then a case of the conflicting knowledge is identified, wherein the root cause analysis is triggered based on the redundant knowledge and the conflicting knowledge of each root cause when one of a failure occurs in a system or a subsystem of the industry plant, and when the system or the subsystem in the industry plant is indicating a possible failure, wherein a pseudo code of the pseudo codes is a textual representation of unit knowledge of a root cause or a root cause path, wherein the root cause analysis in real-time requires knowledge of the root cause for the industrial process in a computer implementable format and real-time detection of failures as soon as they occur or as the system indicates a tendency towards the failure through information coming from the one or more sensors;

communicate, via the one or more hardware processors, one or more action plans to a controller for rectifying each root cause in the root cause graph based on the root cause analysis; and execute by the controller one or more actions from the one or more action plans comprising one or more of repair, mitigation, containment, or control of at least one of the one or more industrial processes and the one or more equipment for rectifying each root cause in the root cause graph based on the root cause analysis, deviation in the performance indicator (PI), and the arrangement of root causes in the plurality of levels, wherein in response to rectifying the root cause, the deviation in the performance indicator returns back in normal operation range.

6. The system of claim 5, wherein the process model is at least one of a data-based model, a physics-based model, an empirical model, and a hybrid model.

7. The system of claim 5, wherein the detection model is at least one of a data-based model, a physics-based model, a pattern identification model, an empirical model, and a hybrid model.

8. The system of claim 5, wherein the root cause graph is represented in at least one of a tree representation format, a tabular representation format, and a graphical representation format.

9. One or more non-transitory machine-readable information storage mediums comprising one or more instructions which when executed by one or more hardware processors cause a method for real-time root cause analysis, comprising:

obtaining information pertaining to one or more industrial processes being executed by one or more equipment in an industry plant, wherein the information comprises piping and instrumentation diagram (PID), operational data, maintenance history, root cause knowledge, and a process model, and wherein the root cause knowledge is based on the PID, the operational data, the maintenance history, and the process model, wherein the information represents knowledge of the one or more equipment, a failure mode and the root cause analysis;

receiving a process ontology, and wherein the process ontology comprises information pertaining to one or more of (i) the one or more equipment, (ii) a location of one or more sensors deployed within the one or more equipment, (iii) sensory information captured through the one or more sensors thereof, wherein the one or more sensors measure one or more parameters including a velocity estimated by a velocity sensor, a quality estimated by a quality estimation sensor, a pressure or force estimated by a pressure sensor or a force sensor, a temperature estimated by a temperature sensor, a density estimated by a density sensor, corresponding to performance of the one or more equipment, (iv) information on an interaction between at least one of (a) the one or more equipment and (b) the one or more industrial processes, (v) one or more parameters of the one or more industrial processes, or (vi) one or more action plans, and wherein the one or more action plans comprise one or more of repair, mitigation, containment, or control of at least one of the one or more industrial processes and the one or more equipment, wherein the process ontology is associated with a power generation industrial process in a thermal power plant and the power generation industrial process includes a sub-process including a coal combustion steam generation, wherein the power generation industrial process has a process parameter including a load and during operation of the thermal power plant, the thermal power plant generates the load through the power generation industrial process and the power generation industrial process starts with coal combustion through the sub-process producing gas as an output, wherein the thermal power plant comprises the one or more equipment including a boiler, a turbine, a generator, wherein the boiler further comprises equipment part including a super heater, a water wall, wherein the water wall further comprises a sub-equipment including a soot blower, and a value of a steam flow rate associated with the soot blower provides an indication of working of the soot blower;

transforming the root cause knowledge to a set of machine instructions, the set of machine instructions comprising an associated detection state of one or more detections identified through a detection model using data captured in real time by one or more sensors within the one or more equipment, wherein the associated detection state is at least one of a positive detection state and a negative detection state, wherein information from the one or more sensors is mapped to the process ontology, and wherein transforming the root cause knowledge to the set of machine instructions comprises deriving a logic in the set of machine instructions from the root cause knowledge by obtaining a pseudo code of the one or more detections along with the associated detection state;

generating a root cause path comprising one or more root causes and associated interdependencies using (i) the process ontology and (ii) the transformed root cause knowledge, and wherein the one or more root causes are detected using the detection model, each root cause being connected to at least one other root cause and each root cause having the one or more detections;

generating a root cause graph using the root cause path, wherein the root cause graph represents the one or more detections, root cause associated with each of the one or more detections, and detection state associated with each of the one or more detections, wherein the one or more root causes are detected using a binary detection based on a unique combination of the one or more detections and the associated detection state, through the detection model, wherein the root cause graph comprises a performance indicator (PI) that is used as a trigger for performing root cause analysis in real-time, wherein a first root cause comprised in the root cause graph is indicative of the performance indicator (PI) corresponding to the one or more industrial processes, wherein one or more root causes are hierarchical arranged after the first root cause in the root cause graph in a plurality of levels, wherein root causes of a level of the plurality of levels are directly affected by deviation in root causes of a previous level of the plurality of levels, wherein the root cause graph is a visual representation of the root cause along with the industrial process and equipment knowledge, wherein the root cause graph is created by combining knowledge from the process ontology and a cause and failure mode graph, and wherein combining the knowledge from the process ontology and the cause and failure mode graph enables i) passing of detections from the process ontology to the root cause uniquely and ii) identification of duplicate knowledge; and executing pseudo codes which are machine readable codes or machine instructions for performing root cause analysis, in real time, after converting the root cause graph into the pseudo codes, wherein the root cause graph enables identification of at least one of a redundant knowledge and a conflicting knowledge of each root cause associated with each of the one or more detections, wherein if a same set of detections and their corresponding detection states are connected with more than one root cause, then a case of the redundant knowledge is identified, and if two different set of detections and their corresponding detection states are connected to a same root cause, then a case of the conflicting knowledge is identified, wherein the root cause analysis is triggered based on the redundant knowledge and the conflicting knowledge of each root cause when one of a failure occurs in a system or a subsystem of the industry plant, and when the system or the subsystem in the industry plant is indicating a possible failure, wherein a pseudo code of the pseudo codes is a textual representation of unit knowledge of a root cause or a root cause path, wherein the root cause analysis in real-time requires knowledge of the root cause for the industrial process in a computer implementable format and real-time detection of failures as soon as they occur or as the system indicates a tendency towards the failure through information coming from the one or more sensors;

communicating one or more action plans to a controller for rectifying each root cause in the root cause graph based on the root cause analysis; and executing by the controller one or more actions from the one or more action plans comprising one or more of repair, mitigation, containment, or control of at least one of the one or more industrial processes and the one or more equipment for rectifying each root cause in the root cause graph based on the root cause analysis, deviation in the performance indicator (PI), and the arrangement of root causes in the plurality of levels, wherein in response to rectifying the root cause, the deviation in the performance indicator returns back in normal operation range.

10. The one or more non-transitory machine-readable information storage mediums of claim 9, wherein the process model is at least one of a data-based model, a physics-based model, an empirical model, and a hybrid model, and wherein the detection model is at least one of a data-based model, a physics-based model, a pattern identification model, an empirical model, and a hybrid model.

\* \* \* \* \*